US012051410B2

(12) United States Patent
Choi et al.

(10) Patent No.: US 12,051,410 B2
(45) Date of Patent: *Jul. 30, 2024

(54) METHOD AND APPARATUS TO PROVIDE COMPREHENSIVE SMART ASSISTANT SERVICES

(71) Applicant: Computime Ltd., New Territories (HK)

(72) Inventors: Hung Bun Choi, Hong Kong (CN); Kai Nang Pang, Hong Kong (CN); Yau Wai Ng, Hong Kong (CN); Chi Chung Liu, Hong Kong (CN); Tsz Kin Lee, Hong Kong (CN)

(73) Assignee: Computime Ltd., New Territories (HK)

( * ) Notice: Subject to any disclaimer, the term of this patent is extended or adjusted under 35 U.S.C. 154(b) by 519 days.

This patent is subject to a terminal disclaimer.

(21) Appl. No.: 17/240,340

(22) Filed: Apr. 26, 2021

(65) Prior Publication Data

US 2021/0249013 A1    Aug. 12, 2021

Related U.S. Application Data

(63) Continuation of application No. 16/133,899, filed on Sep. 18, 2018, now Pat. No. 11,024,307.

(Continued)

(51) Int. Cl.
*G10L 15/00* (2013.01)
*G10L 15/08* (2006.01)
(Continued)

(52) U.S. Cl.
CPC ............ *G10L 15/22* (2013.01); *G10L 15/08* (2013.01); *G10L 15/30* (2013.01);
(Continued)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 1,073,552 A * 9/1913 Vaish ................ E05F 15/54
49/284
10,379,808 B1 * 8/2019 Angel ................ G10L 15/22
(Continued)

FOREIGN PATENT DOCUMENTS

| WO | 054230 A1 | 1/2005 |
| WO | 2016054230 A1 | 4/2016 |
| WO | 2017095476 A1 | 6/2017 |

OTHER PUBLICATIONS

Jul. 2, 2019—(EP)—Extended European Search Report—App 19154543.3.

*Primary Examiner* — Vu B Hang
(74) *Attorney, Agent, or Firm* — Banner & Witcoff, Ltd.

(57) ABSTRACT

An apparatus supports smart assistant services with a plurality of smart service providers. The apparatus includes an audio device that receives a speech signal having a user utterance, captures the user utterance when the user utterance includes a user wake word, and sends the captured utterance to a backend computing device. The backend computing device replaces the user wake word with specific wake words associated with different smart service providers. The processed utterances are then sent to selected smart service providers. The backend computing device subsequently constructs feedback to the user utterance based on voice responses from the different smart service providers. The backend computing device then passes a digital representation of the feedback to the audio device, and the audio device converts the digital representation to an audio reply to the user utterance.

28 Claims, 12 Drawing Sheets

Related U.S. Application Data

(60) Provisional application No. 62/627,929, filed on Feb. 8, 2018.

(51) Int. Cl.
*G10L 15/22* (2006.01)
*G10L 15/30* (2013.01)

(52) U.S. Cl.
CPC .. *G10L 2015/088* (2013.01); *G10L 2015/223* (2013.01); *G10L 2015/225* (2013.01)

(58) Field of Classification Search
CPC ... G10L 15/063; G10L 15/08; G10L 21/0208; G10L 25/78; G10L 25/87; G10L 15/14; G10L 15/1815; G10L 15/197; G10L 13/00; G10L 13/04; G10L 13/06; G10L 13/07; G10L 13/08
See application file for complete search history.

(56) References Cited

U.S. PATENT DOCUMENTS

| | | | |
|---|---|---|---|
| 10,540,451 B2 * | 1/2020 | Prendergast | G10L 15/005 |
| 10,614,811 B2 * | 4/2020 | Gabel | G10L 15/32 |
| 10,735,916 B2 * | 8/2020 | Gilmartin | G06F 16/784 |
| 11,024,307 B2 * | 6/2021 | Choi | G10L 15/22 |
| 2018/0210874 A1 * | 7/2018 | Fuxman | G06N 3/045 |

* cited by examiner

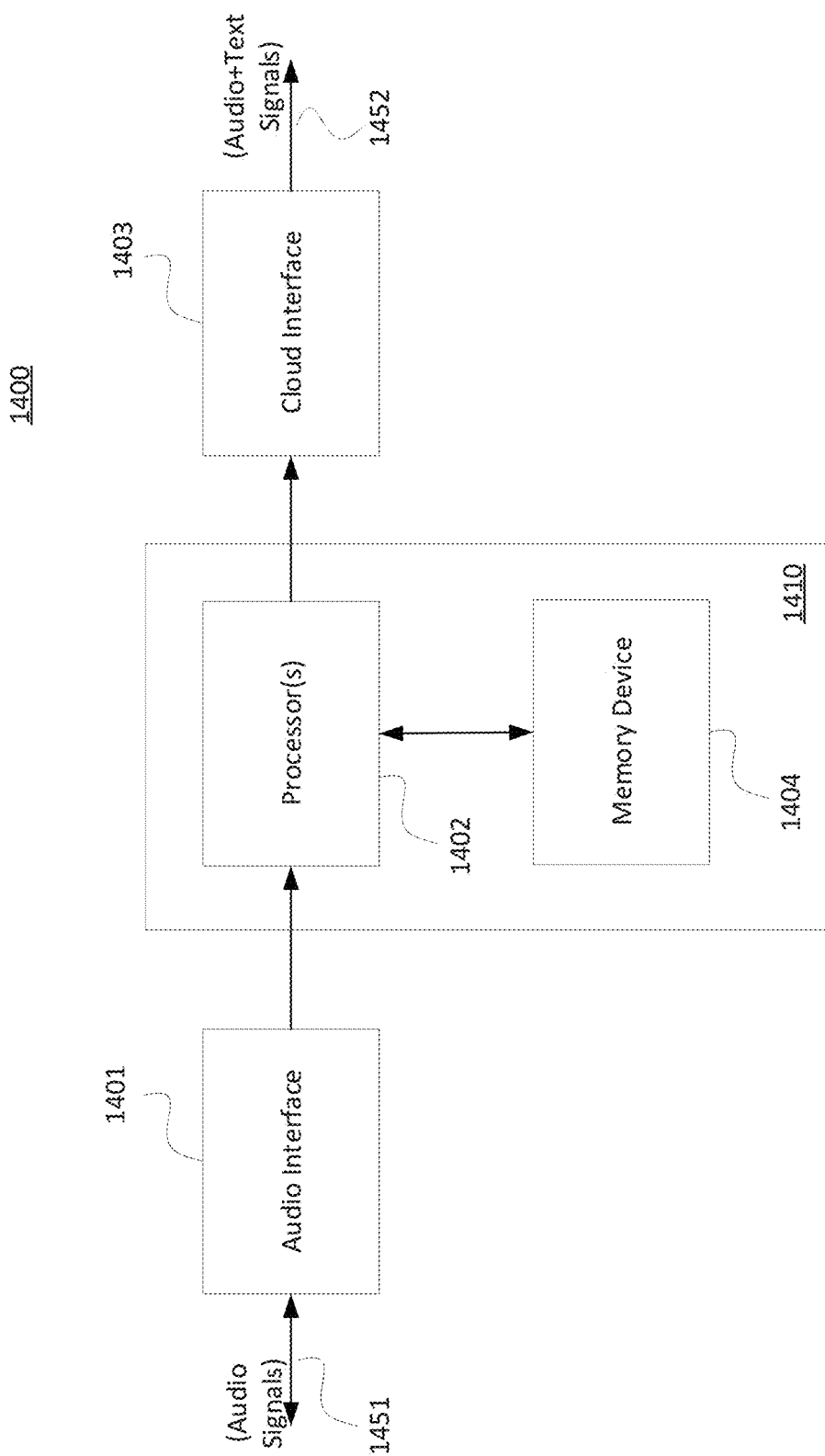

METHOD AND APPARATUS TO PROVIDE COMPREHENSIVE SMART ASSISTANT SERVICES

This patent application claims priority to U.S. Provisional Patent Application No. 62/627,929 entitled "Method and Apparatus to Provide Comprehensive Smart Assistant Services" filed on Feb. 8, 2018 and to U.S. Non-Provisional patent application Ser. No. 16/133,899 entitled "Method and Apparatus to Provide Comprehensive Smart Assistant Services" filed on Sep. 18, 2018, which are hereby incorporated by reference in its entirety.

TECHNICAL FIELD

Aspects of the disclosure relate to providing smart assistance services through an audio-enabled device.

BACKGROUND OF THE INVENTION

Human machine interaction via direct speech conversation is becoming more prevalent with technology advances in speech recognition and natural language processing. For example, a user is able to check information from the Internet, control remote smart devices, and check remote device status through direct conversation to an audio device (which may include audio transducers) due to smart assistant services provided by different companies. To distinguish themselves among other service providers, each company typically requires dedicated audio hardware to support its corresponding services and a specific wake word to trigger the hardware to capture and send an utterance to the Internet for processing.

SUMMARY OF THE INVENTION

An aspect supports a single audio device is triggered to capture an utterance with the inclusion of a user wake word. The utterance is then sent to a cloud server for further processing. The process includes adding specific wake words for different service providers at the beginning of the utterance and dispatching the utterance to the associated smart assistance service providers; converting the utterance to text and conducting a web search at the same time; receiving the responses from the all the service providers including text and voice feedbacks; combining and post-processing the answers from all the service providers; and providing the feedback to the user. The services include, but are not limited to, information checking, device controls, status checking, and so forth. Addition information, which relates to the things of interest (TOI) associated with the utterance, may also be provided to the user. For example, a user may ask for information about a movie, and the device subsequently provides the answer to the user. At the same time, the service may also suggest the cinemas that show the movie and any seasonal sales in the associated shopping malls.

With another aspect, different assistant services are provided by different service providers that may be captured altogether to provide a better experience for a user than what is typically provided by traditional approaches. Services encompass support of different languages, different promotion events, and local activities.

With another aspect, an apparatus supports smart assistant services with at least one smart service provider. The apparatus includes an audio device that receives a speech signal having a user utterance and captures the user utterance when the user utterance includes a user wake word. The apparatus also includes a backend computing device that receives the captured user utterance from the audio device, replaces the user wake word with a specific wake word in the user utterance to form a processed utterance, and sends the processed utterance to a smart service provider, where the user wake word and the specific wake word are different.

With another aspect, an apparatus supports a smart assistant services with a plurality of smart service providers. A backend computing device replaces the user wake word with first and second specific wake words in the user utterance to form first and second processed utterances, respectively. The first and second processed utterances are then sent to first and second smart service providers, respectively.

With another aspect, a backend computing device obtains first and second voice responses from first and second smart service providers, respectively. The backend computing device subsequently constructs feedback to the user utterance based on the first and second voice responses from the first and second smart service providers. The backend computing device then passes a digital representation of the feedback to the audio device, and the audio device converts the digital representation to an audio reply to the user utterance.

With another aspect, an audio device is able to trigger an audio capture feature based on a user defined wake word or special audio condition. The wake word or special audio condition may be pre-defined by a manufacturer or defined by the user.

With another aspect, a wake word model may be trained within an audio device. The wake word model may also be trained by Internet-accessible equipment, such as personal computers, notebooks, tablets, mobile phones, and the like, and then downloaded to the device.

With another aspect, an audio capturing service may be activated when a wake word is detected or special audio condition occurs to capture an utterance. The capturing service may be terminated when the end of speech is detected or reaches a pre-defined limitation.

The utterance may be processed and then sent to a backend server for processing.

With another aspect, a captured utterance may be with or without the wake-word.

With another aspect, an audio device is able to trigger an audio capture feature based on a user trigger. The user trigger may be, but not limited to, a wake word, a sound or a special audio condition, a hand gesture, a body gesture, a facial expression or biology signature, or combination of above. The user trigger may be chosen by user, defined by manufacturers, or based on requirements of a service provider.

With another aspect, a speech compression algorithm may be used to reduce the data traffic between an audio device and a backend server.

With another aspect, an utterance is processed by a backend server according to rules defined by each smart assistant service providers and uploaded to the corresponding servers for query. For example, an English wake word is added to the beginning of the utterance and sent to the corresponding smart assistant server for query, and a Mandarin wake word is added to the beginning of the utterance and sent to the corresponding Mandarin-based smart assistant server for query. The parameters of the speech utterance may be extracted according to the specification defined by the service provider and sent to the corresponding server for query.

With another aspect, an answer may be provided to user based on the speed of service provider feedback. In this situation, the backend server checks the first answer received from any service provider, ensuring it has a meaningful content, and then sends the answer to the audio device for playback. The remaining feedback from other service providers may be discarded.

With another aspect, a backend server waits for feedback from all the service providers. The backend server combines the answers from all the service providers and sends the resultant answer to the audio device for playback.

With another aspect, rules may be introduced to control the number of answers received from different service providers before result examination and combination is carried out.

With another aspect, invalid feedback and feedback without a meaningful content may be neglected. The backend server may learn from the previous decisions and determine the worthiness service providers. After sufficient learning, the backend server may select "the best" feedback for replying to the user. "The best" feedback is determined by a scoring function, which measures the accuracy of probabilistic predictions. User preference and feedback content may be quantified, weighted, and scored. The best feedback is the one with highest score matching user preference. For example, a Mandarin speaker may always receive meaningful feedback from a Mandarin-based service provider. After a few questions, the backend server may tend to ignore the answers from non-Mandarin based service providers.

With another aspect, a backend server may download the resultant utterance from a service provider that is directly provided to the audio device. Alternatively, a speech compression algorithm may be used to compress the speech signal to save data bandwidth. The coded speech signal is sent to the audio device where it is decoded, synthesized, and played back.

With another aspect, the backend server may receive the utterance information of an utterance from a service provider, synthesize the utterance using a speech synthesis algorithm, and download the synthesized speech signal to the audio device. Alternatively, the utterance information may be sent directly to the audio device, where speech synthesis is performed.

With another aspect, a speech compression algorithm may be used to compress the resultant speech signal to save the data bandwidth.

With another aspect, a backend server may convert the utterance to text message, extract keywords from the text message, and conduct web-based searches to the keywords to find out any interesting information, activities, or events associated with the keywords. The result may be combined with the results received from a smart assistant service provider to form a complete search result. For example, if a user asks for information about a movie, the backend server may send the utterance to different service providers according to corresponding rules. At the same time, the backend server converts the utterance to text message, extracts the movie title, and conducts a web-based search for the movie. The results from the smart assistant service provider and the web-based search may be combined to form a complete search result. The result may then be converted to voice feedback.

With another aspect, a backend server may receive promotion materials associated with the search results. The backend server may process the promotion materials according to adaptive rules and experience learnt to provide an answer to the user, together with the query result.

With another aspect, a backend server may learn from the questions that a user presents so that the backend server can provide the answer in a prompt manner if similar questions are posted again.

With another aspect, a backend server may capture a search result from an individual user. If the user is not satisfied with an answer and asks the same question again, the backend server may remember the user experience together with other information such as the speed of response, the accuracy of the answer, the hit rate of the promotion events, and the like. The backend server may learn from these types of user experience and bias towards service providers that provide the best response to the user.

With another aspect, data mining may be implemented to extract the user behavior, such as habit, preference and avoidance, and the like for marketing events.

With another aspect, all processes that are carried out by a backend server may be implemented within the audio device when sufficient resources (processing power, memory, and so forth) are available in the device.

With another aspect, a speech synthesis process may be split at a backend server and audio device. The utterance information is transmitted between the backend server and audio device.

With another aspect, promotion services response in text may be provided to a backend server for rules processing.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

FIG. 14 shows an apparatus that captures an utterance and then sends a processed utterance to a cloud server for further processing in accordance with an embodiment.

Figure 1:
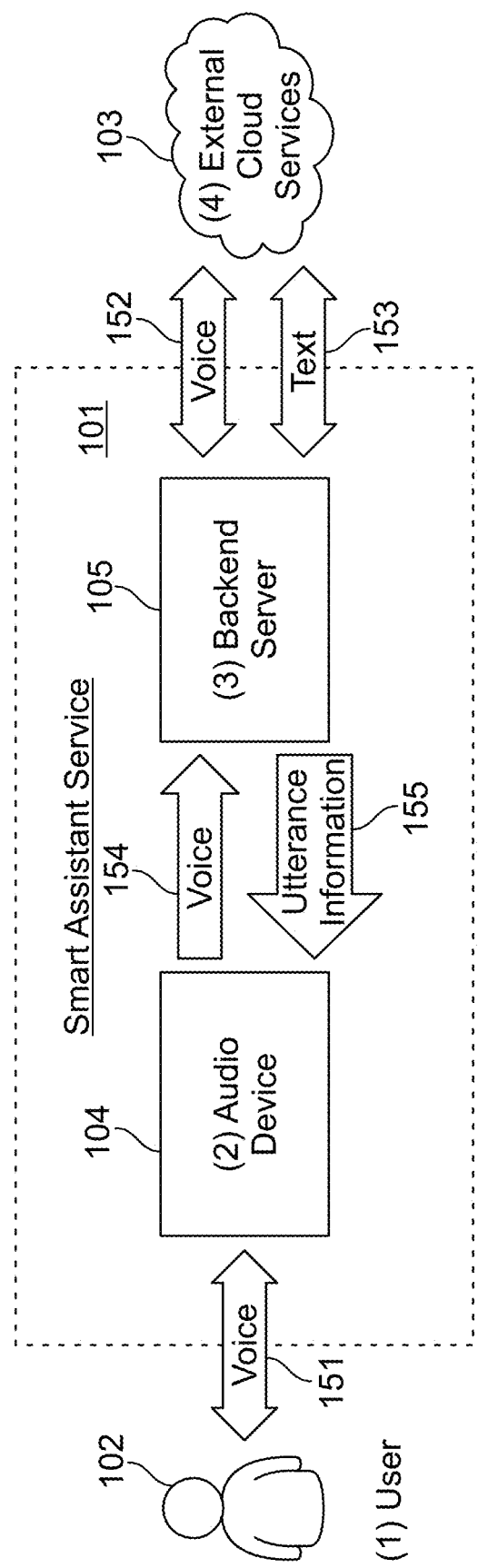
FIG. 1 shows apparatus that provides smart assistance services in accordance with an embodiment.

It will be apparent to one skilled in the art after review of the entirety disclosed that the steps illustrated in the figures listed above may be performed in other than the recited order, and that one or more steps illustrated in these figures may be optional.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Illustrative embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (for example, a system, computer executable product, and/or other device), a method, or a combination of the foregoing. Accordingly, embodiments of the present invention may take the form of an entirely hardware embodiment, an entirely software embodiment (including firmware, resident software, micro-code), or an embodiment combining software and hardware aspects that may generally be referred to herein as a "system." In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media. Embodiments of the present invention are described below with reference to flowchart illustrations and/or block diagrams of processes or apparatuses (the term "apparatus" including systems and computer executable products). It will be understood that each block of the flowchart illustrations and/or block diagrams, and combinations of blocks in the flowchart illustrations and/or block diagrams, can be implemented by computer executable instructions. These computer executable instructions may be provided to a processor of a special purpose computer or other executable data processing apparatus to produce a particular machine, such that the instructions, which execute by the processor of the computer or other executable data processing apparatus, create mechanisms for implementing the functions/acts specified in the flowchart and/or block diagram block or blocks.

These computer executable instructions and algorithms described herein may also be stored in a computer-readable memory that can direct a computer or other executable data processing apparatus to function in a particular manner, such that the instructions stored in the computer readable memory produce an article of manufacture including instructions, which implement the function/act specified in the flowchart and/or block diagram block or blocks.

Traditional approaches for supporting smart assistant services typically lack hardware compatibility between different service providers. Consequently, in order to benefit from smart assistant services from a plurality of service providers, a user typically has to buy hardware from all of them. Moreover, different service providers may support different languages and dialects. Furthermore, a service provider may provide certain services that are not available from other service providers.

With one aspect of the embodiments, a single audio device is triggered to capture an utterance with the inclusion of a user wake word. The utterance is then sent to a cloud server for further processing. The process includes adding specific wake words for different service providers at the beginning of the utterance and dispatching the processed utterance to the associated smart assistance service providers; converting the utterance to text and conducting a web search at the same time; receiving the responses from the all the service providers including text and voice feedbacks; combining and post-processing the answers from all the service providers; and providing the feedback to the user. Services include, but are not limited to, information checking, device controls, status checking, and so forth. Addition information, which relates to the things of interest (TOI) associated with the utterance, may also be provided to the user. For example, a user may ask for information about a movie, and the device subsequently provides the answer to the user. At the same time, the process may also suggest the cinemas that show the movie and any seasonal sales in the associated shopping malls.

With another aspect of the embodiments, a user trigger may be a wake word, a sound or a special audio condition, a hand gesture, a body gesture, a facial expression or biology signature, or combination of above. The user trigger may be chosen by user, defined by manufacturers, or based on requirements of a service provider.

With another aspect of the embodiments, different assistant services are provided by different service providers that may be captured altogether to provide a better experience for a user than what is typically provided by traditional approaches. Services encompass support of different languages, different promotion events, local activities, and so forth.

FIG. 1 shows apparatus 101 that provides smart assistance services in accordance with an embodiment. User 102 refers to an end user of smart assistant service 101. User 102 interacts with smart assistant services 101 through direct voice interaction 151.

Audio device 104 may include audio transducers and signal processing capability to provide speech signal capturing, audio signal processing, speech recognition, speech synthesis, speech signal playback, and so forth. The audio transducers may include microphone(s) for speech signal capturing and speaker(s) for speech signal playback. Audio device 104 may be, but not limited to, a smart home control panel, a thermostat, a game console, a home security system, and so forth.

With some embodiments, backend server 105 is the "brain" of smart assistant service 101. It receives speech input 154 from user 102 through the audio device 104 to conduct the services. Moreover, it receives all the feedbacks 152,153 from the series of search events and other associated responses from external cloud service providers 103. Server 105 processes all the information and sends a final response to audio device 104 in form of synthesized speech or compressed speech data. However, with some embodiments backend server 105 may send the utterance information 155, and speech synthesis is performed locally within audio device 104.

With some embodiments, backend processing may be performed by a backend computing device such as backend server 105 and/or various computing devices including one or more microcomputer units (MCU), digital signal processors (DSP), and/or field programmable gate arrays (FPGA).

External cloud services may include, but are not limited to, voice assistant services, search engines, and promotion agencies. Backend server 105 may interact with the external cloud service providers 103 using either voice and/or text data.

Figure 2:
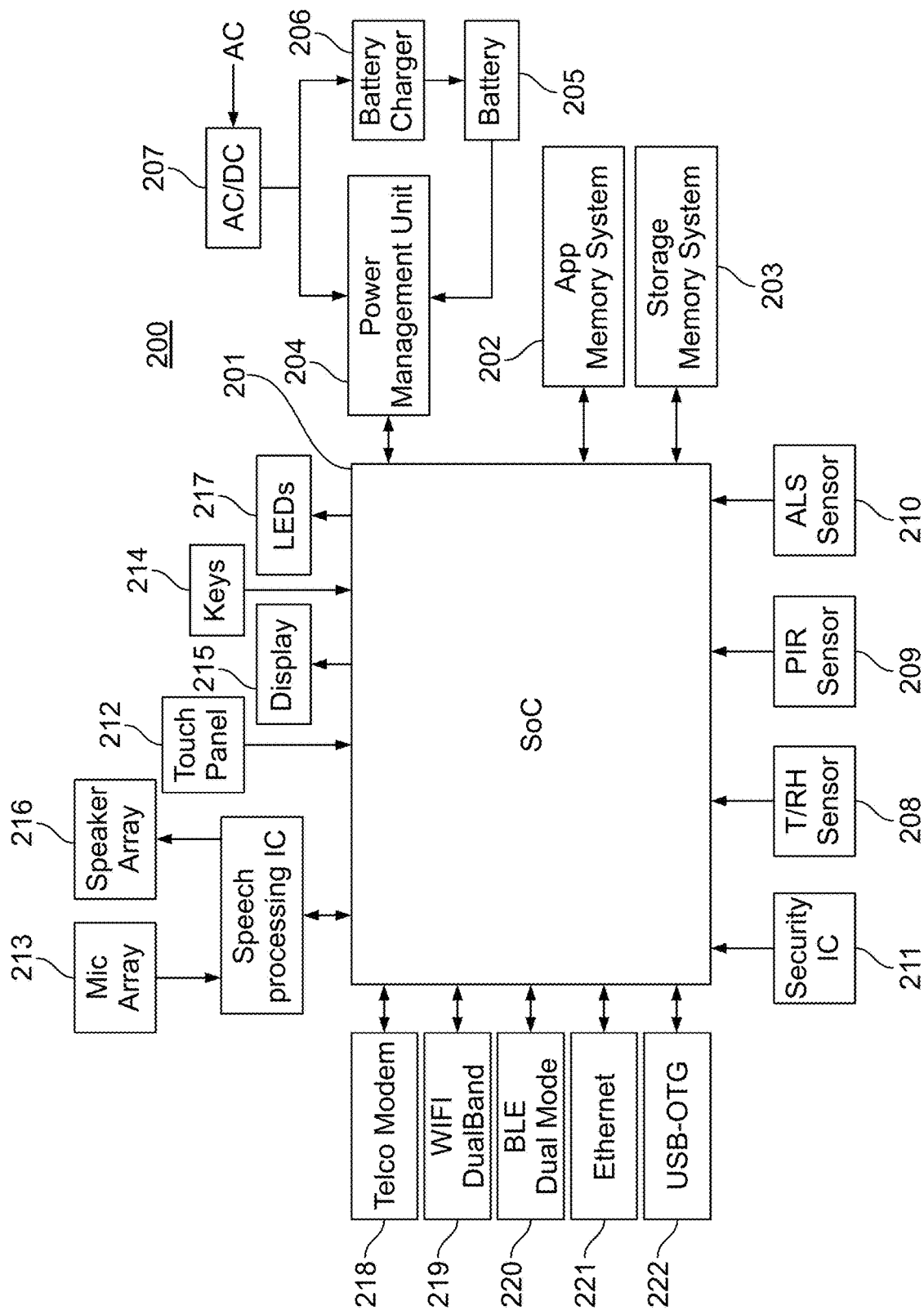
FIG. 2 shows a system block diagram of an audio device that supports a thermostat in accordance with an embodiment.

FIG. 2 shows system block diagram of audio device 200 in form of a thermostat in accordance with an embodiment. The building blocks of audio device 200 includes a basic subsystem, storage memory subsystem, sensor subsystem, security subsystem, user interface (UI) subsystem, and connectivity subsystem. The thermostat connected to a backend sever can access the information from the smart service providers. For example, the backend server can also actively acquire the weather forecast information from smart service provider to provide a more intelligent temperature adjustment for the thermostat such that can save more power for the user. Moreover, warning messages can be provided (for example, air pollution level, heavy rain, storms, hurricanes, etc.).

The basic subsystem comprises main processor 201 and corresponding memory devices 202, a power management unit(s) 204, and other system components.

Main processor 201 may be a single core SoC processor core or a multicore SoC with numerous co-processor and accelerators. Multiple processors may also be used depending on the feature requirements, such as when voice synthesis is performed in audio device 200 by receiving utterance information from a backend server.

Different combination of memory device(s) may be used (SSD, eMMC, NAND, NOR, DDR3, SDRAM, EEPROM) depending on feature requirements.

The core building block of the power management unit (PMU) 204 may be simply discrete components or a complex power management IC (PMIC) as well as multiple DC-DC converters and LDOs. Battery 205 with battery charging circuitry 206 may be used as the power supply. Alternatively, AC/DC adaptor 207 may be used. Backup power supply may also be included.

Memory storage subsystem 203, such as HDD or SSD storage, may be installed for data storage if data analytic, data mining, machine learning or voice synthesis is needed in the audio device.

A sensor subsystem composes of multiple sensors can be installed based on the application scenarios. The sensors include, but are not limited to:

Temperature and relative humidity sensor (T/RH) 208: A combo temperature (Temp) and relative humidity (RH) sensor can be used to monitor the ambient temperature and relative humidity, such as those for thermostats.

PIR sensor 209: A PIR sensor can be installed to detect the presence of human object(s) within the area of interest, such as those for thermostats or security systems.

Ambient light sensor 210: An ambient light sensor may be installed, such as automatic backlight adjustment for user experience enhancement in thermostats or automatic IR shutter manipulation in security systems.

Security subsystem 211 may also be included to strengthen the protection of user identity and data.

A user interface subsystem comprises inputs (including touch panel 212, mic array 213, and feature keys 214) and outputs (including display 215, speaker array 216, and LED(s) 217). Other user inputs and outputs means may also be added to enhance the user experience of the smart environment.

Display 215 and capacitive touch panel 212: Traditional UI means, such as display and capacitive touch panel may be used as the basic user interface.

Speaker 216 and mic arrays 213: Audio transducers are installed for speech signal capturing and playback. A mic array together with audio processing algorithms is used to provide a clear utterance in noisy environment. A speaker array may be used to provide audio feedback.

The mic array 213 may also be used to detect the position of a user so that the voice feedback can be focused towards the user's position when a more complex speaker array system is available.

The connectivity subsystem includes wireless connectivity and wired connectivity.

The wireless connectivity subsystem, depending on the application requirements, may be a combination of Telco modem 218, dual band WiFi 219, and BLE dual mode 220.

BLE dual mode 220 may be used to allow audio streaming to Bluetooth speakers if necessary.

The wired connectivity subsystem may be a combination Ethernet 221 and USB OTG 222.

Figure 3:
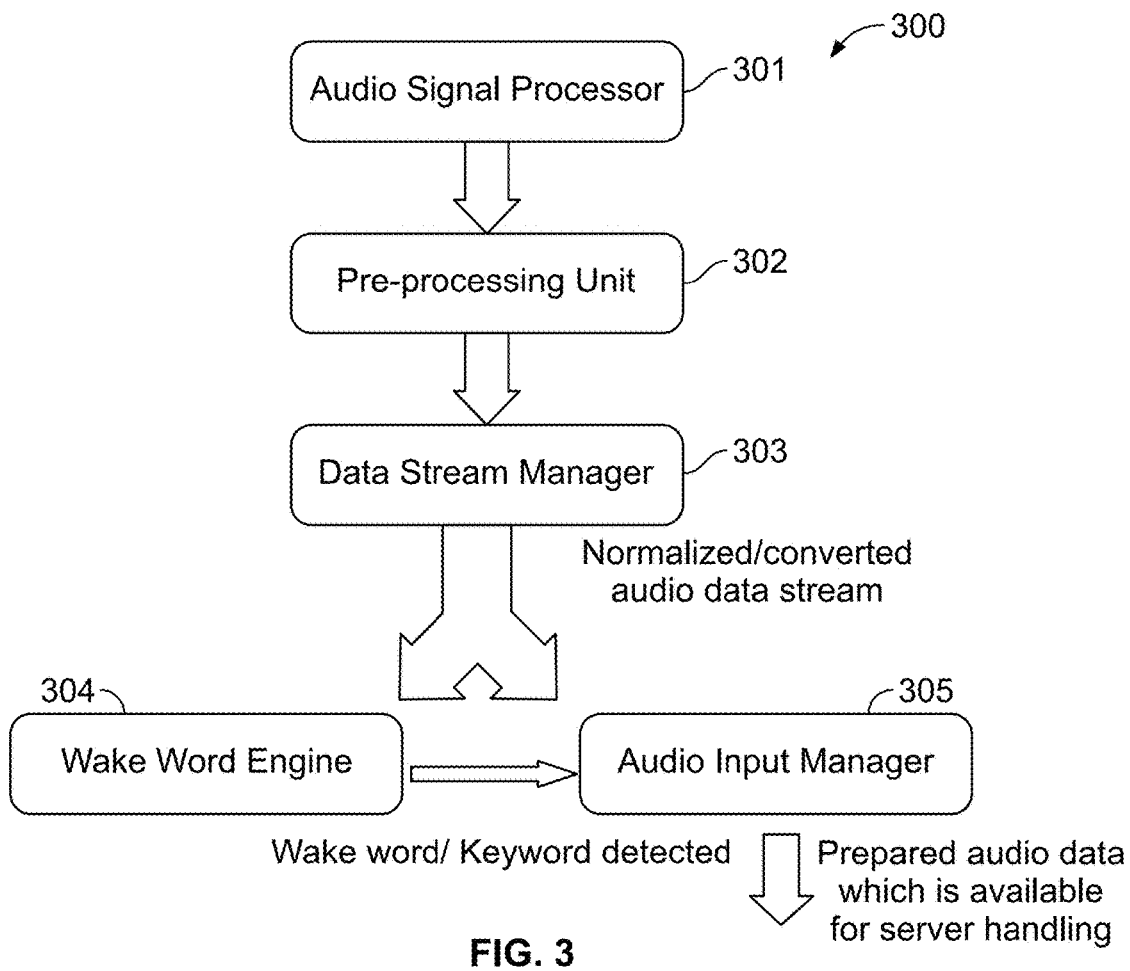
FIG. 3 shows an apparatus in which speech signal capturing is triggered by wake word detection within an audio device in accordance with an embodiment.

FIG. 3 shows apparatus 300 in which speech signal capturing is triggered by wake word detection within an audio device in accordance with an embodiment.

Audio signal processor 301 may comprise a processing unit that processes the audio signals from the input channels. Signal processing algorithms may be designed to enhance the audio signal such as, but are not limited to, voice activity detection (VAD), active noise cancellation (ANC), acoustic echo cancellation (AEC), Automatic Gain Controller (AGC), and beam forming (fixed or adaptive). If a microphone array is used, the signal processor may reconstruct and output a single audio stream from the array.

Pre-processing unit 302 converts or normalizes the audio signal to formats compatible with the backend server.

Data stream manager 303 comprises a single producer with a multi-consumer buffer that allows data to be transported from a single data source to multiple data sinks.

Wake word engine 304 comprises application software that is able to detect wake word(s) and to report it to audio input manager 305. Wake word engine 304 may support online, offline or both online and offline recognition. The offline mode is a model in which no Internet connection is needed. The online mode is a model in which recognition is performed by a remote server so that an Internet connection is needed. Mixed mode is a model that supports both models, and the system determines the method to use according to runtime network connectivity and latency.

Audio input manager 305 receives detection results from wake word engine 304 and audio data from data stream manager 303. It also arranges and handles audio inputs for further processing.

Figure 4:
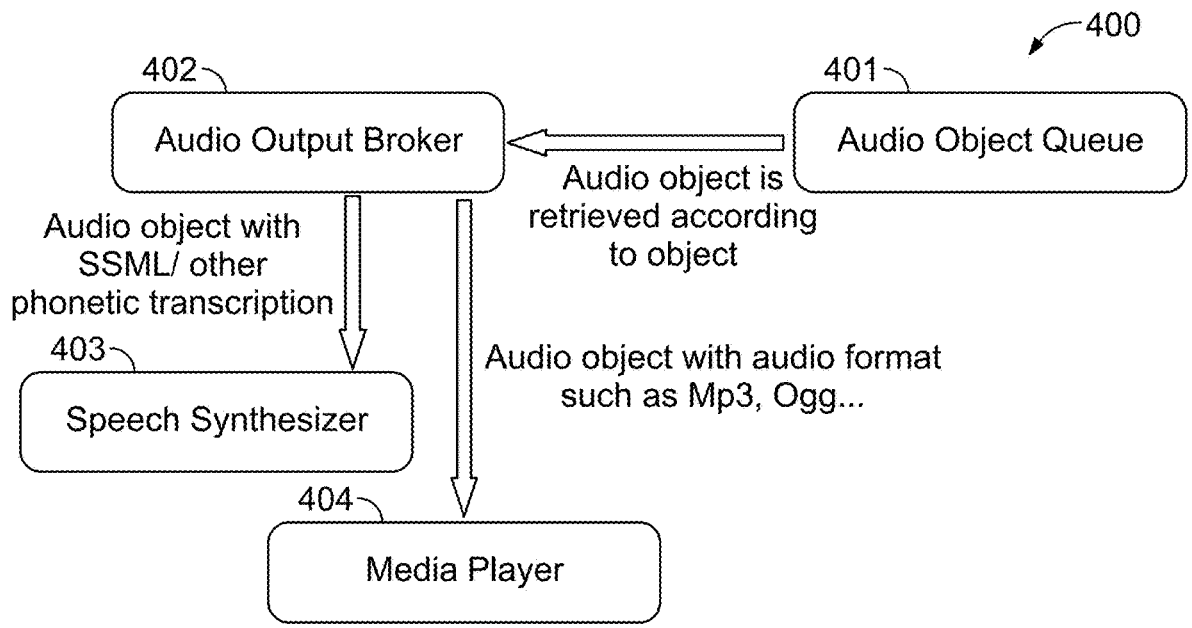
FIG. 4 shows an audio device that synthesizes speech from received information in accordance with an embodiment.

FIG. 4 shows audio device 400 that synthesizes speech from the received signal, which may include a raw audio stream, a compressed audio data, or the utterance information of a resultant utterance in accordance with an embodiment.

Audio object queue 401 is an entry for audio rendering. Queue 401 may include a raw audio stream, compressed audio data including, but not limited to MP3, AAC, Ogg, a link to external sources, a reference to internal resource, a reference to internal temporary cached resource, and SSML/ phonetic transcription for speech synthesizer. Each object has its own priority for rendering. Audio object queue 401 provides storage for received audio objects from internal or external sources.

Audio output broker 402 retrieves audio objects from audio object queue 401 according to priority. It may find correct audio data/resource and allocate audio data/resource to the associated handling unit, such as speech synthesizer 403 or media player 404 for playback.

It also may handle stopping/pausing/resuming of audio playback when a high priority audio object arrives at audio object queue 401.

Speech synthesizer 403 synthesizes audio output from SSML or other phonetic transcription from audio output broker 402.

Media player 404 produces raw audio data for output from audio data provided by audio output broker 402.

Figure 5:
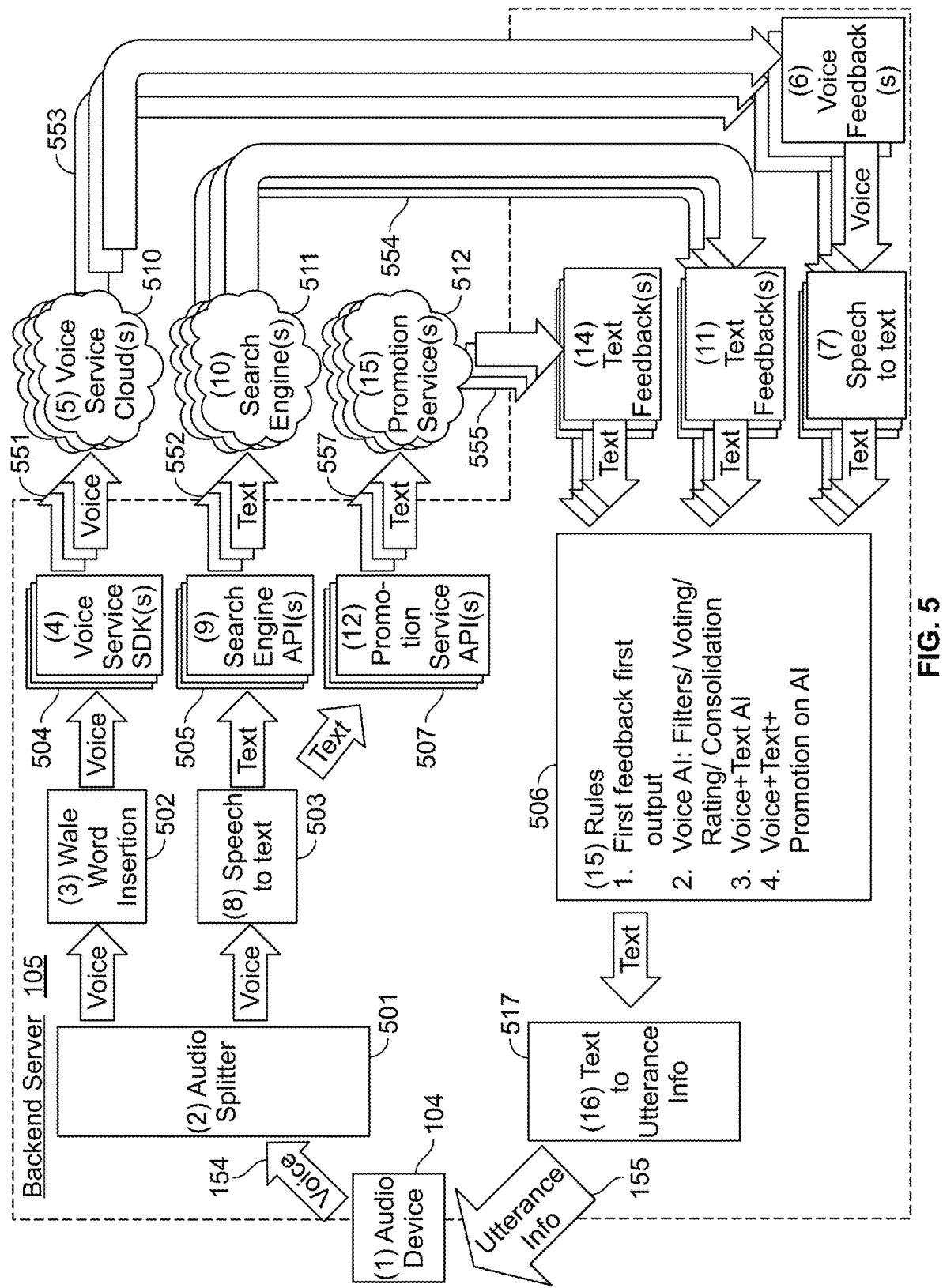
FIG. 5 shows a backend server in accordance with an embodiment.

FIG. 5 shows backend server 105 in accordance with an embodiment.

Audio device 104 acts as an interface between an end user and backend server 105. The communication between audio device 104 and backend server 105 may assume different forms including digitized speech data, compressed speech data or utterance information.

Audio splitter 501 of backend server 105 splits received utterance 154 into multiple data paths including wake word conversion and speech-to-text.

A wake word is inserted to the utterance that is applicable to the associated smart service provider by wake word converter 502. For example, utterance 154 may include a user wake word that alerts backend server 105 to replace the user wake word with specific wake words for one or more smart service providers.

With some embodiments, a user trigger may comprise a non-verbal component other than a user wake word, for example, a sound or a special audio condition, a hand gesture, a body gesture, a facial expression or biology signature, or combination of above. The user trigger may be chosen by a user, defined by manufacturers, or based on requirements of a service provider. Device 104 and/or 105 may know the selections of triggering methods locally. Once device 104 and/or 105 is triggered, the utterance may be captured and sent to the backend server for query of smart services.

External voice service software development kits (SDK's) 504 may be integrated into backend server 105. Utterance 551 with a corresponding wake word (corresponding to signal 551) may be sent to associated smart service providers via external voice service cloud 510. Subsequently, in response to utterance 551, voice feedback 553 is provided to backend server 105 from the associated smart service providers via voice service cloud 510.

Voice feedbacks 553 may be converted to computational data for AI rule engine processing by converting speech to text.

The same utterance (i.e., utterance 154) from audio splitter 501 may also be converted to text data, which is understandable by search engines 511, by speech-to-text converter 503.

Backend server 105 may send speech input in text format 552 to search engines 511 through available application programming interfaces (API's) 511.

Search engine(s) 511 may process the request from backend server 105 and respond with feedback having text format 554.

Text feedbacks 554 from the search engine(s) 511 may be suitable for AI rule processing 506. Otherwise, data conversion may be conducted to translate the received information to a required format.

Backend server 105 may send speech input in a text format 557 to promotion services 512 through available APIs 507. Promotion service(s) may include online marketing agencies that provide information relevant to utterance 154. The response may be sent to backend server 105 in a text format.

Text feedbacks 555 from the promotional services 512 may be suitable for AI rule processing 506. Otherwise, data conversion may be performed to translate the received information to a required format.

Rules are operated by rule engine(s) 506 that are carried out different combinations with different levels of AI learning.

First feedback first output—Invalid feedback and feedback without a meaningful content would be neglected. The first feedback from various voice service cloud(s). The other feedbacks will be stored and learnt by the AI system. The end user could read all feedbacks from the log/history at the backend (i.e. via the web UI). The user could vote for "the best" feedback (for example, via the web UI).

Voice AI—After sufficient learning with AI, the backend server could select "the best" feedback for replying the user. Besides the AI learning, the preference of the user could be learnt, for example, languages being used, locations related, hot keywords being searched, and the like.

Voice+Text AI—After further learning with AI, the backend server could select "the best" or construct a message feedback for replying the user from both voice service cloud(s) and search engine(s). The keywords and key-paragraphs from the search engine(s) could be filtered and picked for nomination to be "the best" feedback. "The Best" feedback may be obtained from a scoring function, which measures the accuracy of probabilistic predictions. User preference and feedback content may be quantified, weighted, and scored. The best feedback is the one with highest score matching user preference.

Voice+Text+Promotion AI—After data mining by the AI, the backend server could insert or append suitable promotion or marketing events message(s) on top of the replying message, basing on the user usual behaviors, such as habit, preference and avoidance, etc.

Text output is obtained from rules engine 506 and is converted to utterance information 155 by module 517.

Figure 6:
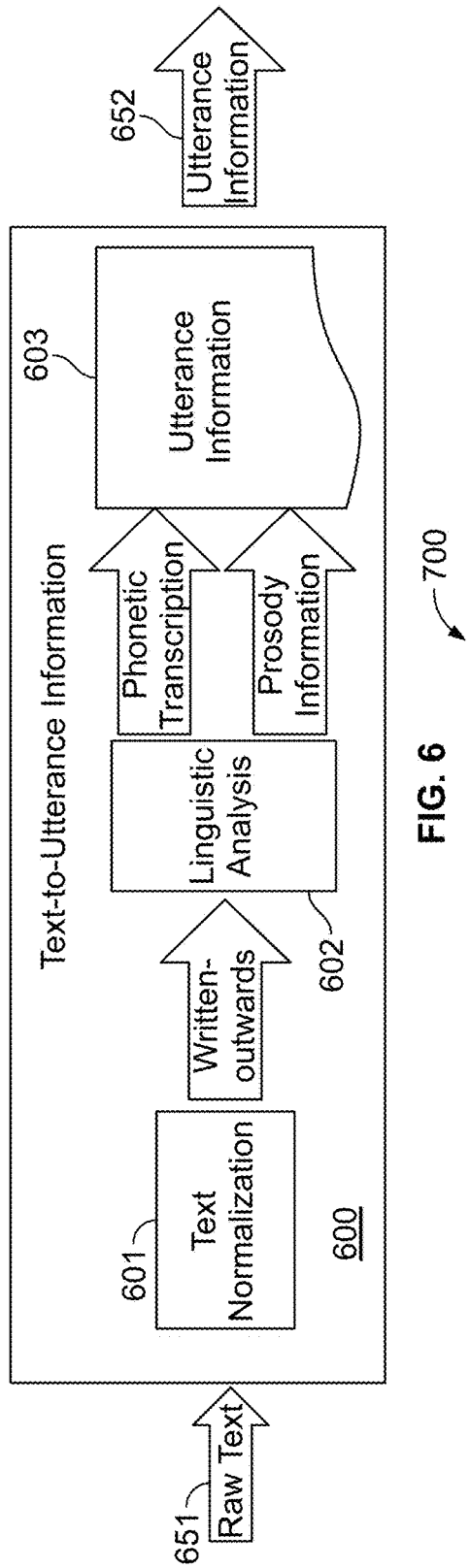
FIG. 6 shows a process for obtaining utterance information from text in accordance with an embodiment.

FIG. 6 shows text-to-utterance module 600 (corresponding to module 517 in FIG. 5) for obtaining utterance information 652 from text 651 in accordance with an embodiment.

Rule engine 506 (as shown in FIG. 5) prepares an answer for a user in text format 651, and the text-to-utterance module 600 prepares the phonetic transcriptions and prosody information for speech synthesis.

First, the text normalizer 601 converts raw text 651 containing symbol-like numbers and abbreviations into the equivalent written-out words. For example, '10' may be converted to 'ten'. Then, linguistic analyzer 602 assigns phonetic transcriptions to each word, and the texts are divided and marked into prosodic units, such as phrases, clauses, and sentences.

Utterance information 603, including phonetic transcriptions and prosody information, is then used for speech synthesis. The synthesized utterance may be sent to audio device 104 (as shown in FIG. 1) for playing back. Speech signal compression may be performed to reduce the data traffic between audio device 104 and backend server 105. With some embodiments, utterance information 652 may be sent to audio device 104, where speech synthesis is locally performed.

Figure 7:
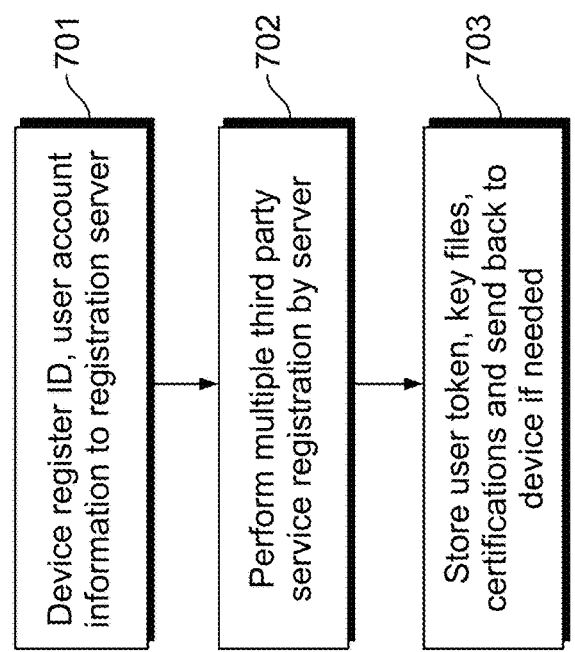
FIG. 7 shows a process performed by a registration server for voice service registration and token access control in accordance with an embodiment.

FIG. 7 shows process 700 performed by a registration server for voice service registration and token access control in accordance with an embodiment.

System 101 (as shown in FIG. 1) may utilize a registration server for voice service registration and token access control at block 701. The registration server may perform third party service registration at block 702 and store the required token, certification, and/or keys files and send back the stored information to system 101 if needed at block 703.

Figure 8:
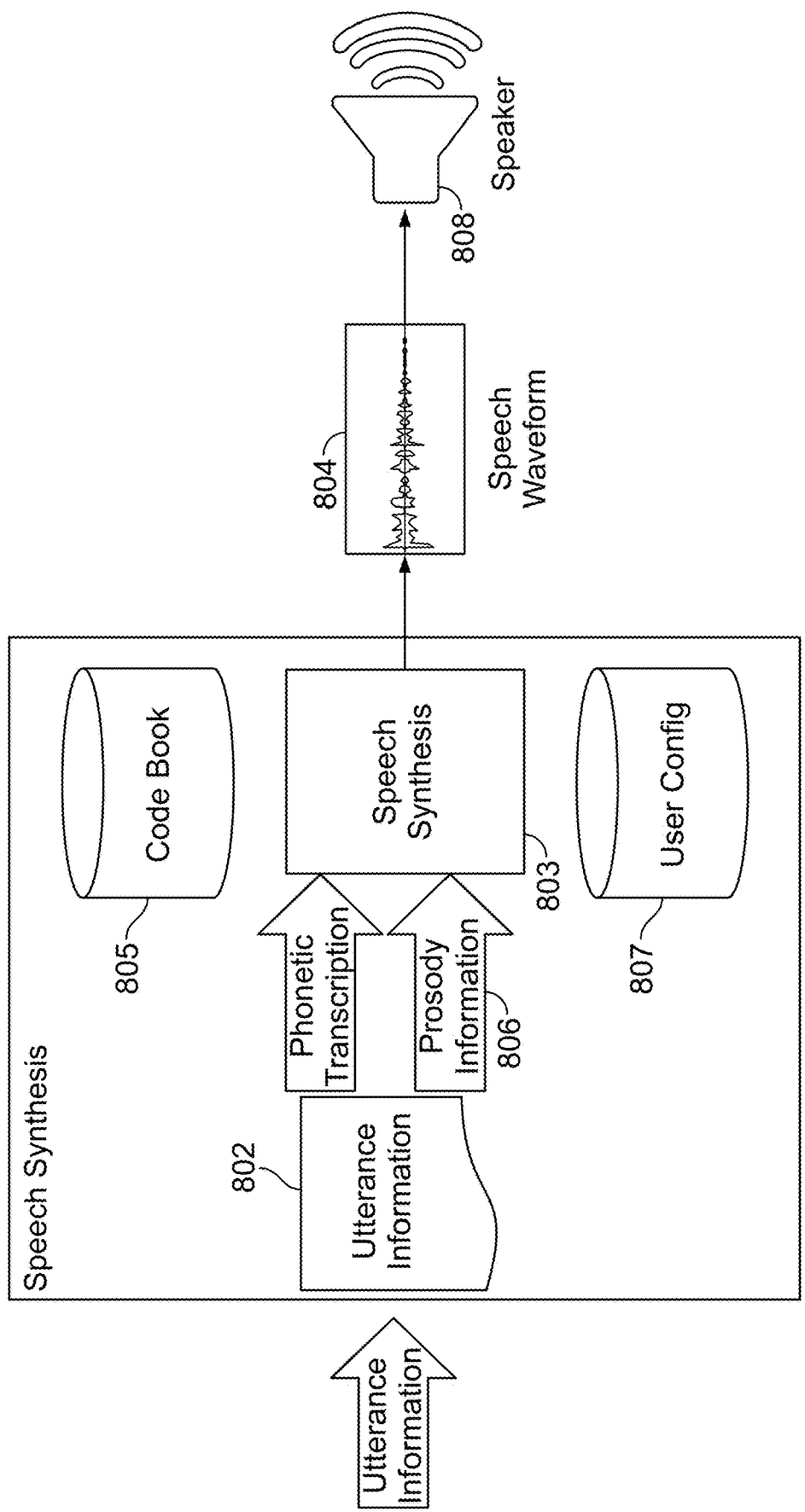
FIG. 8 shows an audio device and backend server that supports speech synthesis in accordance with an embodiment.

FIG. 8 shows an audio device and backend server that supports speech synthesis in accordance with an embodiment.

Speech synthesizer 803 combines the utterance information 802 (including phonetic transcription and prosody information, the phonic codebook and user configuration) to generate speech waveform 804. Phonic codebook 805 represents the raw waveform referring to the phonetic transcription. Prosody information 806 includes the phrasing, duration, intonation, rhythm, pause, and so forth. User configuration 807 includes the user preference, for example, pitch, speech speed, and so forth. The synthesized utterance is then played by audio transducer 808.

Speech synthesis may be performed in an audio device using the utterance information received from a backend server. With some embodiments, this may be performed in the backend server, thus directly providing the synthesized speech signal or a compressed version of the synthesized speech signal.

Figure 9:
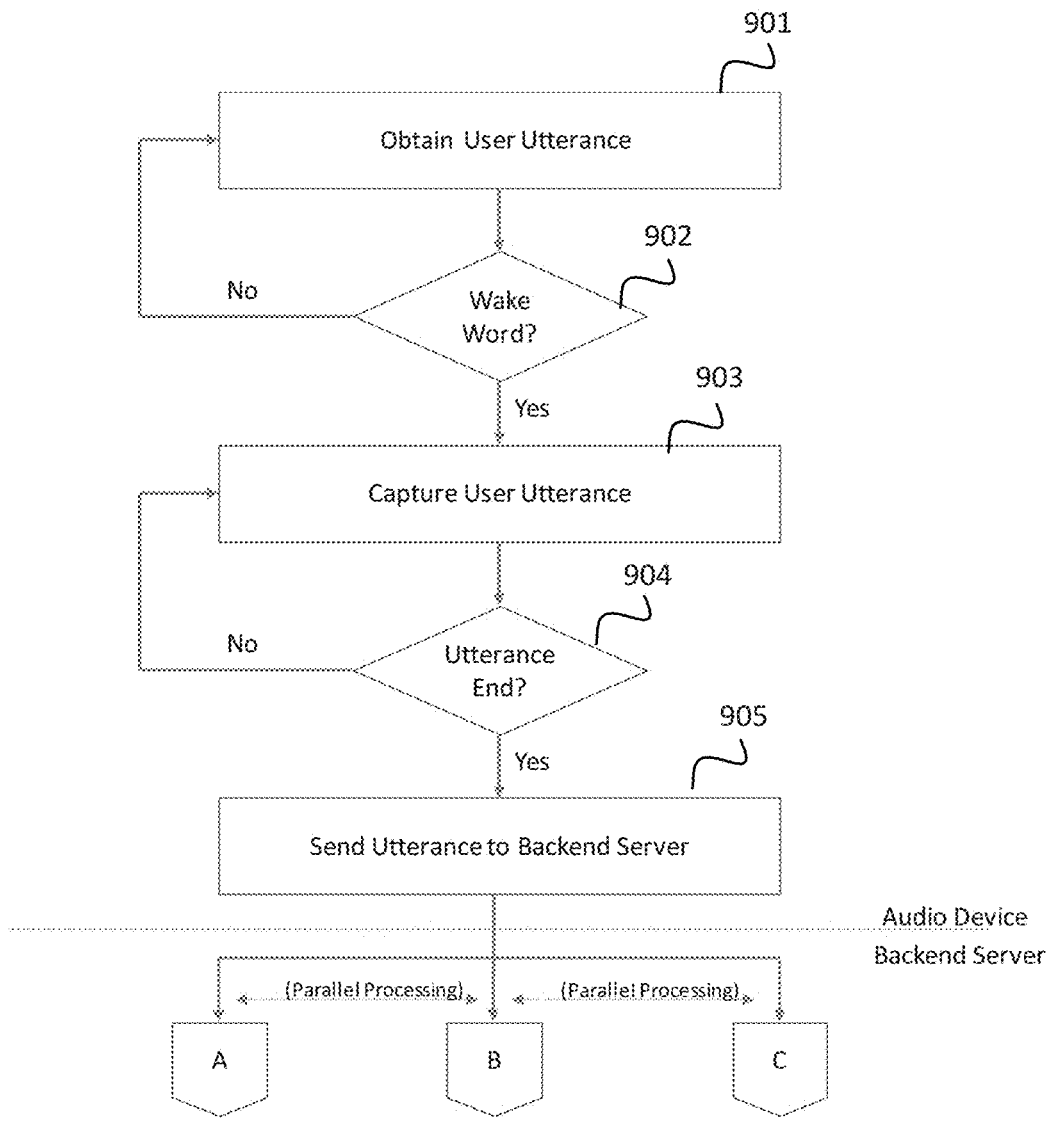
FIGS. 9-13 shows a process performed by an apparatus that supports smart assistance services in accordance with an embodiment.

FIGS. 9-13 show a process performed by an apparatus (for example, audio device 104 and/or backend server 105 as shown in FIG. 1) that supports smart assistance services in accordance with an embodiment Referring to FIG. 9, an utterance spoken by a user is obtained by audio device 104 at block 901. If the obtained utterance includes a user wake word, as determined at block 902, the apparatus captures the utterance at block 903. With some embodiments, the user wake word may be configured specifically for the user and may be different from wake words associated with different smart assistant services.

When the end of the utterance is detected at block 904, the utterance (for example, the digital representation) is sent to backend server 105 at block 905 As will be discussed, the utterance may be parallel processed by the blocks shown in FIGS. 10-12.

Figure 10:
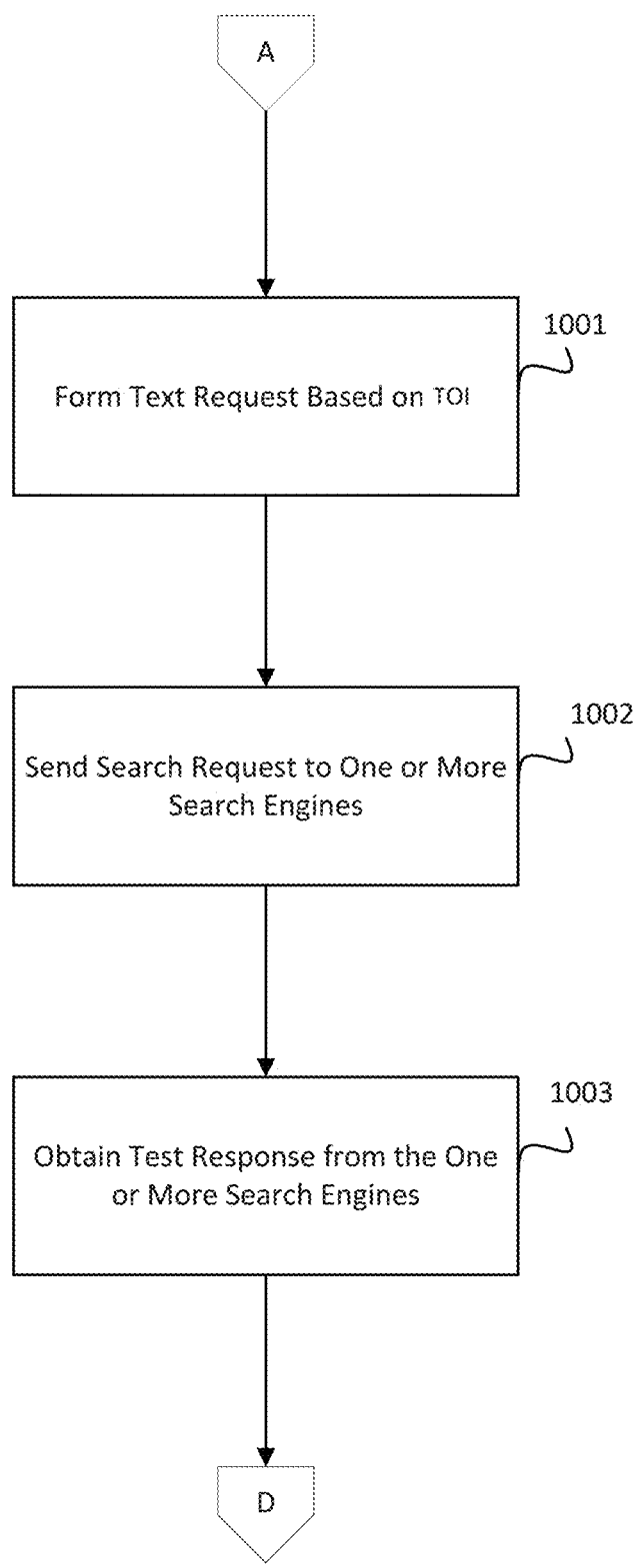

Referring to FIG. 10, a text request is formed from the utterance based on the identified thing of interest (TOI) at block 1001 and the request is sent to one or more search engines at block 1002. Responses from the one or more search engines are obtained at block 1003.

Figure 11:
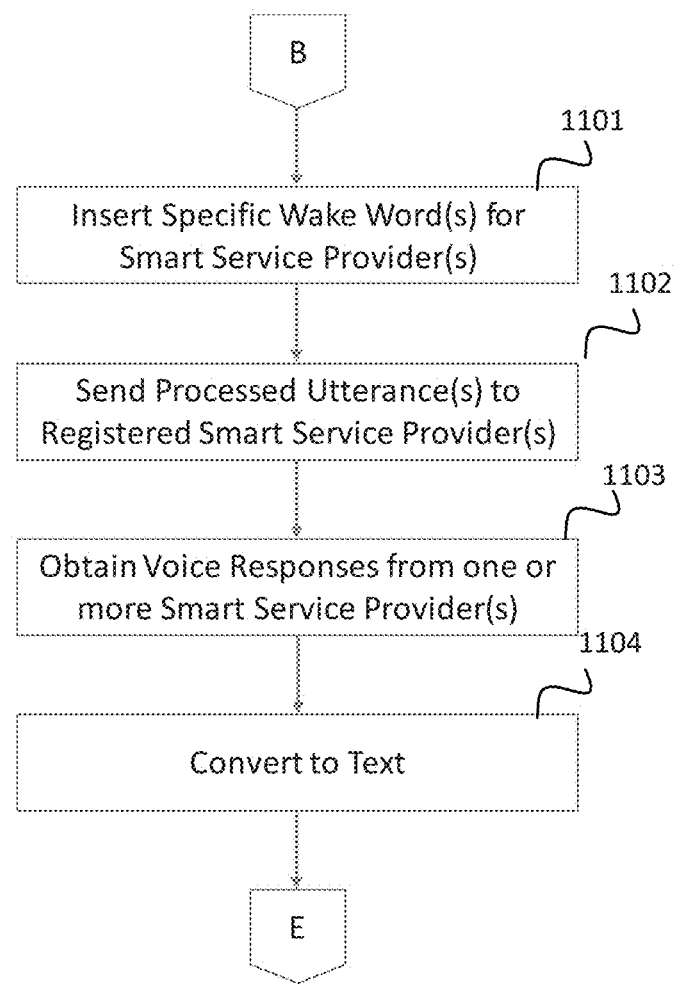

Referring to FIG. 11, specific wake words (for example, specific to a particular smart service provider) are inserted into the utterance to replace the user wake word at block 1101. The processed utterances are sent to the corresponding smart service providers (for example, those smart service providers that are registered with the user's smart assistant service) at block 1102. Responses from the smart service providers are obtained at block 1103 and converted to text at block 1104.

Figure 12:
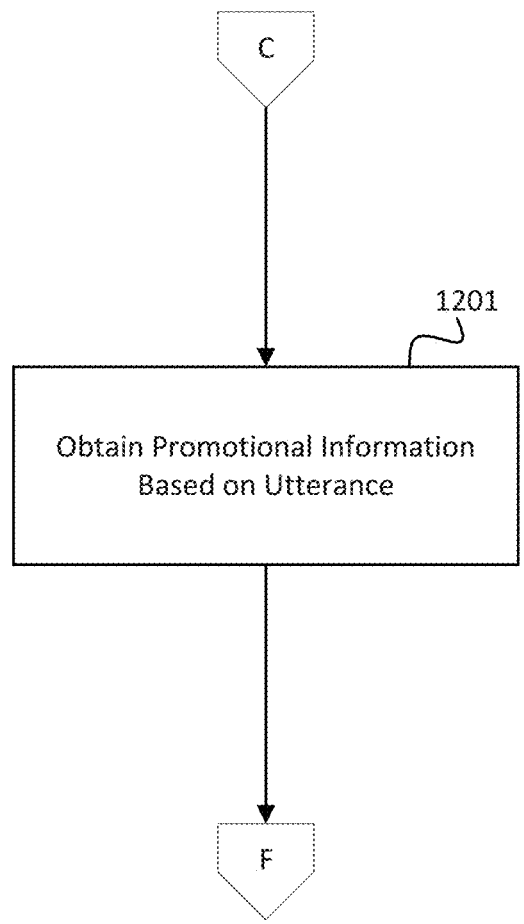

Referring to FIG. 12, promotional information based on the utterance is obtained from promotional services 512 (as shown in FIG. 5) at block 1201.

Figure 13:
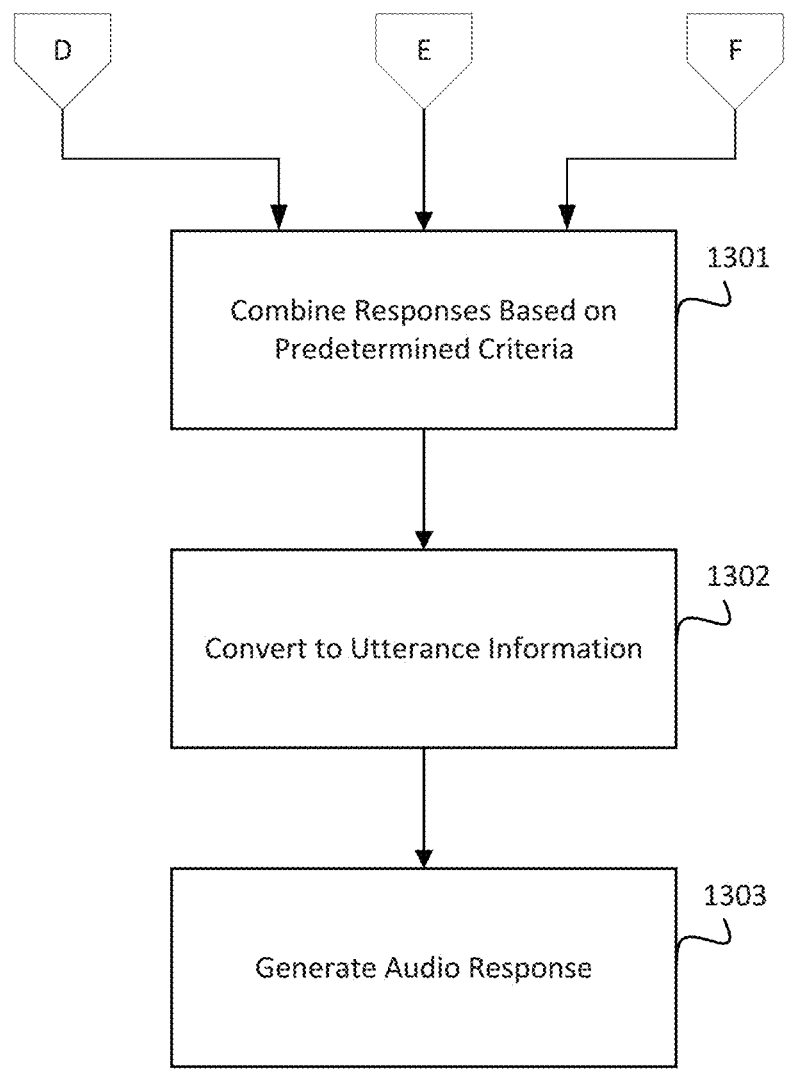

Referring to FIG. 13, information obtained from blocks 1003, 1104, and 1201 are collected and combined in accordance with predetermined criteria at block 1301. The combined information is converted into utterance information, as previously discussed, at block 1302. An audio response from the utterance information is then generated for the user at block 1303.

FIG. 14 shows apparatus 1400 that captures an utterance and then sends a processed utterance to a cloud server for further processing. Apparatus 1400 comprises audio interface 1401, computing device 1410, and cloud interface 1403.

Audio interface obtains audio signal 1451 comprising an utterance from a user and sends a processed signal 1452 to external cloud services (for example, cloud services 103 as shown in FIG. 1) via cloud interface 1403.

With some embodiments, computing device 1410 comprises one or more processors 1402 for controlling overall operation of the computing device 1410 and its associated components, including memory device 1404 (for example, RAM and ROM).

Computing device 1410 typically includes a variety of computer readable media. Computer readable media may be any available media that may be accessed by computing device 1410 and include both volatile and nonvolatile media, removable and non-removable media. By way of example, and not limitation, computer readable media may comprise a combination of computer storage media and communication media.

With some embodiments, apparatus 1400 may be implemented with a plurality of different physical units such as audio device 104 and backend server 105. Consequently, processor(s) 1402 may be implemented with different processors at audio device 104 and backend server 105. However, with some embodiments apparatus 1400 may be implemented as one physical unit having the functionality of both an audio device and a backend server.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 1410.

Computer-executable instructions may be stored within memory device 1404 and/or storage to provide instructions to processor 1402 for enabling computing device 1410 to perform various functions. Embodiments may include forms of computer-readable media. Computer-readable media include any available media that can be accessed by computing device 1410. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

The following capabilities may be supported by the embodiments.

- An audio device is able to trigger an audio capture feature based on a user defined wake word or special audio condition. The wake word or special audio condition may be pre-defined by the manufacturer or defined by the user.
- With a user defined wake word, a wake word model may be trained within an audio device. The wake word model may also be trained by Internet-accessible equipment, such as personal computers, notebooks, tablets, mobile phones, and the like, and downloaded to the device.
- An audio capturing service may be activated when a wake word or sound is detected or special audio condition occurs to capture an utterance. The capturing service may be terminated when the end of speech is detected or reaches a pre-defined limitation. The utterance may be processed and then sent to a backend server for processing.
- The captured utterance may be with or without the wake-word.
- Speech compression algorithm may be used to reduce the data traffic between an audio device and a backend server.
- An utterance is processed by a backend server according to rules defined by each smart assistant service providers and uploaded to the corresponding servers for query. For example, an English wake word is added to the beginning of the utterance and sent to the corresponding smart assistant server for query, and a Mandarin wake word is added to the beginning of the utterance and sent to the corresponding Mandarin-based smart assistant server for query. The parameters of the speech utterance may be extracted according to the specification defined by the service provider and sent to the corresponding server for query.
- An answer may be provided to user based on the speed of service provider feedback. In this case, the backend server checks the first answer received from any service provider, ensuring it has a meaningful content, and then sends the answer to the audio device for playback. The remaining feedback from other service providers may be discarded.
- With an embodiment, the backend server waits for feedback from all the service providers. The backend server combines the answers from all the service providers, and sends the resultant answer to the audio device for playback.
- Rules may be introduced to control the number of answers received from different service providers before result examination and combination is carried out.
- Invalid feedback and feedback without a meaningful content may be neglected. The backend server may learn from the previous decisions and determine the worthiness service providers. After sufficient learning, the backend server may select "the best" feedback for replying to the user. For example, a Mandarin speaker may always receive meaningful feedback from a Mandarin based service provider. After a few questions, the backend server may tend to ignore the answers for non-Mandarin based service providers.
- For audio playback, the backend server may download the resultant utterance from a service provider that is directly provided to the audio device. Alternatively, the backend server may synthesize an utterance using a speech synthesis algorithm and then download the synthesized speech signal to the audio device. With another approach, the utterance information may be downloaded to the audio device and speech synthesis is carried out by the audio device.
- A speech compression algorithm may be used to compress the resultant speech signal to save the data bandwidth.
- For value added services, the backend server may convert the utterance to text message, extract keywords from the text message, and conduct web-based searches to the keywords to find out any interesting information, activities, or events associated with the keywords. The result may be combined with the results received from a smart assistant service provider to form a complete search result. For example, if a user asks for information about a movie, the backend server may send the utterance to different service providers according to corresponding rules. At the same time, the backend server converts the utterance to a text message, extracts the movie title, and conducts a web-based search for the movie. The results from the smart assistant service provider and the web-based search may be combined to form a complete search result. The result may then be converted to voice feedback.
- For other value added services, the backend server may receive promotion materials associate with the search results. The backend server may process the promotion materials according to adaptive rules and experience learnt to provide an answer to the user, together with the query result.
- The backend server would learn from the questions a user raises so that it can provide the answer in a prompt manner if similar questions are posted again.
- The backend server may capture the search result from an individual user. If the user is not satisfied with the answer and asks the same question again, the backend server may remember the user experience together with other information such as the speed of response, the accuracy of the answer, the hit rate of the promotion events, and the like. The backend server may learn from these kinds of user experience and bias towards the service providers which provide the best response to the user.
- Data mining may be implemented to extract the user behavior, such as habit, preference and avoidance, and the like for marketing events.
- All the processes that are carried out by the backend server may be implemented within the audio device when sufficient resources (processing power, memory, and so forth) are available in the device.
- Speech synthesis process may be split at backend server and audio device. The utterance information is transmitted between backend server and audio device.
- Promotion services response may be provided to backend server in text for rules processing.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

Exemplary Clauses

1. An apparatus supporting smart assistant services with at least one smart service provider, the apparatus comprising:
    an audio device receiving a speech signal comprising a user utterance and capturing the user utterance when the user utterance includes a user wake word; and
    a backend computing device receiving the captured user utterance from the audio device, replacing the user wake word with a first specific wake word in the user utterance to form a first processed utterance, and sending the first processed utterance to a first smart service provider, wherein the user wake word and the first specific wake word are different and wherein the at least one smart service provider includes the first smart service provider.

2. The apparatus of clause 1, wherein the method to trigger the capturing of a user utterance can be, but not limited to, a wake word, a sound or a special audio condition, a hand gesture, a body gesture, a facial expression or biology signature, or combination of above.

3. The apparatus of clause 1, wherein:
    the at least one smart service provider includes a second smart service provider;
    the backend computing device replaces the user wake word with a second specific wake word in the user utterance to form a second processed utterance, and sends the second processed utterance to the second smart service provider; and
    the second specific wake word and the first specific wake word are different.

4. The apparatus of clause 3, wherein:
    the backend computing device obtains first and second voice responses from the first and second smart service providers, respectively;
    the backend computing device constructs feedback to the user utterance based on the first and second voice responses from the first and second smart service providers;
    the backend computing device passes a digital representation of the feedback to the audio device; and
    the audio device converts the digital representation to an audio reply to the user utterance.

5. The apparatus of clause 4, wherein the backend computing device constructs the feedback by selecting one of the voice responses from the first and second smart service providers.

6. The apparatus of clause 4, wherein the backend computing device constructs the feedback by combining the first and second voice responses from the first and second smart service providers.

7. The apparatus of clause 4, wherein the backend computing device converts the user utterance into text data and sends the text data to a search engine.

8. The apparatus of clause 7, wherein the backend computing device receives a text response from the search engine and combines the feedback with the text response.

9. A method for supporting smart assistant services with a smart service provider, the method comprising:
    receiving a speech signal comprising a user utterance;
    capturing the user utterance when the user utterance includes a user wake word; replacing the user wake word with a specific wake word in the user utterance to form a processed utterance;
    sending the processed utterance to a smart service provider, wherein the user wake word and the specific wake word are different;
    obtaining a voice response from the smart service provider;
    constructing feedback to the user utterance based on the voice responses from the smart service provider; and
    generating an audio reply to the user utterance from the feedback.

What is claimed is:

1. An apparatus supporting smart assistant services with at least one service provider, the apparatus comprising:
    an audio device configured to receive a speech signal comprising a user utterance from a user, detect a user trigger, and capture the user utterance in response to the detecting of the user trigger, wherein the user trigger comprises a non-verbal component;
    a backend computing device configured to receive the captured user utterance from the audio device, include a first specific wake word in the user utterance to form a first processed utterance, send the first processed utterance to a first service provider, obtain a first response from the first service provider, and construct first feedback to the user utterance based on the first response; and
    the audio device configured to generate an audio reply to the user utterance from the first feedback.

2. The apparatus of claim 1, wherein the user trigger further comprises an audio signal generated by the user.

3. The apparatus of claim 1, further comprising:
    an imaging sensor configured to capture an image, wherein image information about the image is incorporated into the non-verbal component of the user trigger.

4. The apparatus of claim 3, wherein the image information is indicative of a hand gesture.

5. The apparatus of claim 3, wherein the image information is indicative of a facial expression.

6. The apparatus of claim 3, wherein the image information is indicative of a body gesture.

7. The apparatus of claim 1, wherein the user trigger is selected by the user.

8. The apparatus of claim 1, wherein backend computing device is configured to include a second specific wake word in the user utterance to form a second processed utterance, send the second processed utterance to a second service provider, obtain a second response from the second service provider, and construct second feedback to the user utterance based on the second response, wherein the first and second specific wake words are different.

9. The apparatus of claim 8, wherein the audio device is configured to generate the audio reply to the user utterance from the second feedback.

10. The apparatus of claim 8, wherein the first and second specific wake words correspond to different spoken languages.

11. The apparatus of claim 8, wherein the backend computing device is configured to determine first and second scoring metrics indicative of an accuracy of the first and second responses, respectively, and select only one of the responses based on the first and second scoring metrics.

12. The apparatus of claim 11, wherein the backend computing device is configured to train on previous responses in order to obtain a scoring function, wherein the scoring function measures a probabilistic prediction accuracy and wherein the first and second scoring metrics are obtained from the scoring function.

13. A method for supporting smart assistant services with a service provider, the method comprising:
receiving a speech signal comprising a user utterance from a user;
detecting a user trigger, wherein the user trigger comprises a non-verbal component;
in response to the detecting, capturing the user utterance to obtain a captured user utterance;
including a first specific wake word in the captured user utterance to form a first processed utterance;
sending the first processed utterance to a first service provider;
in response to the sending, receiving a first response from the first service provider;
constructing a first feedback to the user utterance based on the first response; and
generating a reply to the user utterance from the first feedback based on system configuration.

14. The method of claim 13, further comprising:
obtaining information about an image; and
incorporating the information into the non-verbal component of the user trigger.

15. The method of claim 13, further comprising:
including a second specific wake word in the user utterance to form a second processed utterance;
sending the second processed utterance to a second service provider;
obtaining a second response from the second service provider; and
constructing second feedback to the user utterance based on the second response, wherein the first and second specific wake words are different.

16. The method of claim 15, further comprising:
generating the reply to the user utterance based on the second feedback.

17. The method of claim 16, further comprising:
determining first and second scoring metrics indicative of an accuracy of the first and second responses, respectively; and
selecting only one of the responses based on the first and second scoring metrics.

18. The method of claim 13, wherein the user trigger further comprises an audio component.

19. The method of claim 13, wherein the reply comprises an audio reply.

20. The method of claim 13, wherein the reply comprises a non-audio reply.

21. The method of claim 20, wherein the non-audio reply comprises a text message.

22. The method of claim 20, wherein the non-audio reply comprises a displayed hand gesture.

23. One or more non-transitory computer-readable media storing instructions that, when executed by a computing device comprising at least one processor and memory, cause the computing device to perform:
receiving a speech signal comprising a user utterance from a user;
detecting a user trigger, wherein the user trigger comprises a non-verbal component and an audio component;
in response to the detecting, capturing the user utterance to obtain a captured user utterance;
including a first specific wake word in the captured user utterance to form a first processed utterance;
sending the first processed utterance to a first service provider;
in response to the sending, receiving a first response from the first service provider;
constructing a first feedback to the user utterance based on the first response; and
generating a reply to the user utterance from the first feedback.

24. The one or more non-transitory computer-readable media of claim 23, wherein the generating the reply to the user utterance from the first feedback comprises generating an audio reply.

25. The one or more non-transitory computer-readable media of claim 23, wherein the generating the reply to the user utterance from the first feedback comprises generating a non-audio reply that includes at least one of a text message and a displayed animated hand gesture.

26. The one or more non-transitory computer-readable media of claim 23, wherein the instructions that, when executed by the computing device, cause the computing device to perform:
including a second specific wake word in the user utterance to form a second processed utterance;
sending the second processed utterance to a second service provider;
obtaining a second response from the second service provider;
constructing second feedback to the user utterance based on the second response, wherein the first and second specific wake words are different; and
generating the reply to the user utterance from the second feedback in conjunction with the first feedback.

27. The one or more non-transitory computer-readable media of claim 26, wherein the generating the reply to the user utterance from the second feedback in conjunction with the first feedback comprises generating an audio reply.

28. The one or more non-transitory computer-readable media of claim 26, wherein the generating the reply to the user utterance from the second feedback in conjunction with the first feedback comprises generating a non-audio reply that includes at least one of a text message and a displayed animated hand gesture.

* * * * *